July 2, 1963 W. O. NICHOLS 3,095,664
TROLLING SPINNER
Filed Aug. 31, 1961
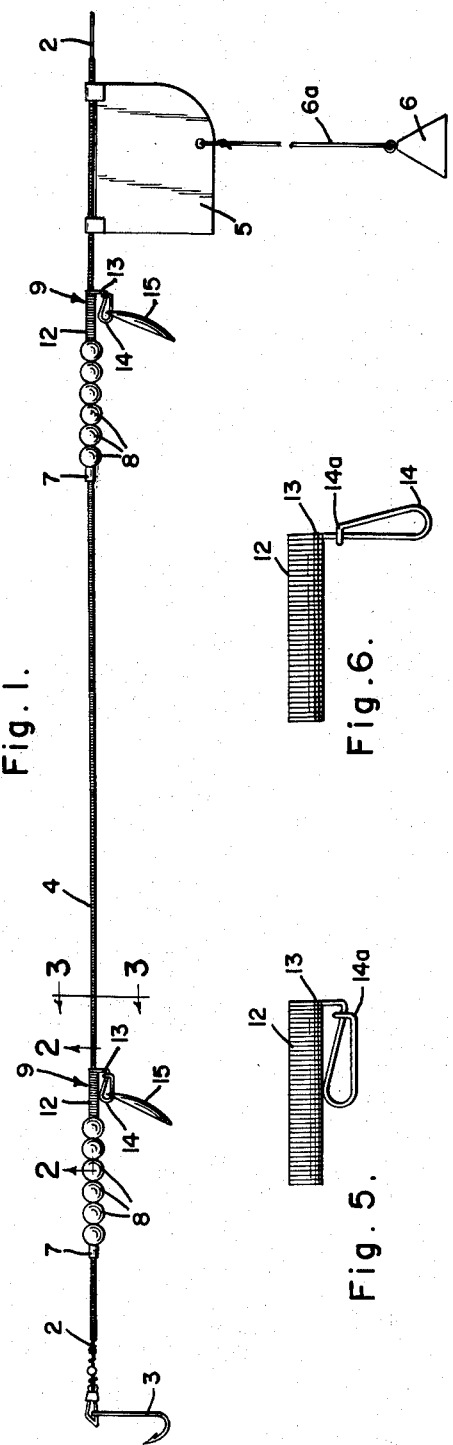
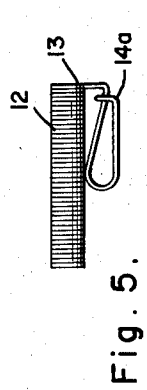
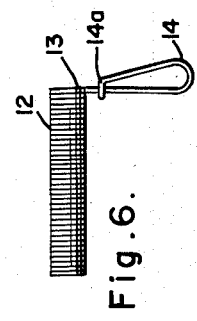
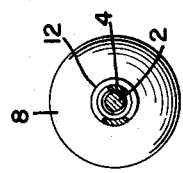
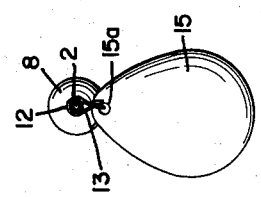
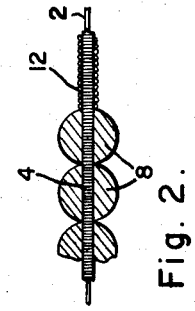
INVENTOR.
William O. Nichols
BY
*Townsend and Townsend*
*attorneys*

United States Patent Office 3,095,664
Patented July 2, 1963

3,095,664
TROLLING SPINNER
William O. Nichols, 2020 Montgomery St., Oroville, Calif.
Filed Aug. 31, 1961, Ser. No. 135,297
4 Claims. (Cl. 43—42.19)

This invention relates to an improved trolling fish lure unit. More particularly, it relates to a trolling spinner unit of the free-sliding type wherein certain of the component parts have been improved to enhance its utility.

In a preferred embodiment the free-sliding trolling unit comprises an open ended tubular base member formed from a flexible coiled spring wire. The tubular base member is adapted to permit a fishing line to pass freely therethrough. At least one clevis is mounted on the tubular base member.

The clevis comprises a length of resilient spring wire. A portion of the length of wire is coiled to form a tube and the remainder of the wire is bent laterally outwardly from the tube and then generally ovally to form a loop for attaching a spinner thereto. The loop portion of the wire terminates in a hook-like bend for releasable engagement with another part of the loop and lateral portion of the wire. The length of wire is bendable in the vicinity of the lateral portion to permit the loop portion to be moved toward and away from the tube portion of the wire for controlling the rotational rate of the spinner.

The tube portion of the length of wire is positioned concentrically around the tubular base member and is adapted to rotate thereon.

The unit includes means associated with the tubular base member for limiting longitudinal movement of each clevis in one direction on the tubular base member.

In the accompanying drawings:

FIG. 1 shows in elevation a portion of a leader and a lure and associated parts embodying the present invention.

FIG. 2 shows in side section a part of the leader and lure of FIG. 1 taken along the line 2—2.

FIG. 3 shows in partial section an end view of the leader and lure of FIG. 1 taken along the line 3—3.

FIG. 4 shows in partial section an enlarged end view of the leader of FIG. 1 taken along the line 4—4.

FIG. 5 shows in enlarged side elevational view the clevis incorporated in the unit of FIG. 1 wherein the loop portion of the clevis is bent in spinner accelerating position.

FIG. 6 shows in enlarged side elevational view the clevis incorporated in the unit of FIG. 1 wherein the loop portion of the clevis is bent in spinner decelerating position.

In essence one of the two major improvements offered by the present invention relates to the tubular base member of the unit in that it is formed from flexible material as opposed to a rigid material. Preferably the material employed is an elongated flexible coil spring of a non-corrosive nature.

The advantages gained by using a flexible material such as a coiled spring for the tubular base member are several. The coil spring body can be stored in a much smaller space than would be otherwise possible. For example, in a trolling unit made up with six spinner blades, the length of the unit would be 3–4 ft. By using a flexible material the trolling unit may be wound in a coil and stored in a package no more than 4 ins. sq. and thus would permit storage of the unit in a tackle box. When so stored, the coil spring body is not subject to bending or kinking which would make the spinner inoperative.

A further advantage lies in the shape the tubular base member assumes after a fish has been hooked. Normally when a fish is hooked and starts back directly toward the fisherman, the improved tubular base member of the present invention will form a U-shape. This causes the line to emerge from the base member substantially axially at both ends and not sharply angularly as would be the case with a rigid tubular base member. This feature eliminates wear on the line as well as the ends of the tubular base member.

Yet another advantage of the flexible base member lies in its attraction for fish which is, of course, the ultimate aim of the device. Thus, if a pair of clevises are employed on the base member, a small blade attached to the front clevis (the clevis closer to the rudder) and a relatively larger blade on the rear clevis, and the unit employed by trolling at a slow speed, the rear blade does not rotate completely but oscillates back and forth. This oscillation in turn agitates the rear clevis and lure. It has been found that this agitation of the rear lure is most attractive to fish and they are inclined to strike more frequently than when the rear lure is not subject to such agitation.

The other major improvement offered by the present invention is in the clevis that is normally mounted on the tubular base member and which serves as the attaching means for mounting a spinner blade on the unit. As is well understood, when a device of the present type is used in trolling, the spinner or blade is caused to rotate.

The design of the present clevis permits bending of the spinner attaching loop portion toward and away from the clevis body. By bending the loop toward the body, the rotational rate of the spinner may be accelerated. By bending the loop away from the body, the rotational rate of the spinner may be decelerated.

With reference to FIG. 1 in particular, there is shown a portion of a fishing line or leader 2 suitably joined to a fish hook 3 at the terminal end thereof. Leader 2 is made from a fine filament such as nylon or other suitable material well known to those skilled in the art. A tubular base member comprising a non-corrosive coil spring 4 is slipped over the leader 2. The inner diameter of coil spring 4 is sufficiently greater than the outer diameter of leader 2 so that leader 2 may pass freely through coil spring 4.

The remaining components of the lure to be described are all mounted on and in relation to coil spring 4 and are not directly attached to leader 2. This type of free-sliding trolling spinner construction and its attendant advantages are described in greater detail in United States Patent No. 2,785,496 to Menkens patented March 19, 1957. The broad concept of its construction forms no part of the present invention, the present invention being based in part upon the improvements and advantages gained through the use of a flexible material in the construction of the tubular base member as discussed above.

At the front end of the coil spring 4 (i.e. the end farthest from the hook 3) a rudder 5 is suitably attached to keep the coil spring 4 from rotating. A weight 6 may be connected to the bottom of the rudder 5 by means of a line 6a for controlling the depth of the lure.

The clevis and spinner assembly 9 are mounted on the coil spring 4 at selected intervals. A suitable unit might include only one clevis and spinner assembly 9 or, as shown in FIG. 1, it may include a plurality of spaced assemblies. Depending on the number of clevis and spinner assemblies desired, the length of the coil spring 4 is selected accordingly. All of the clevis and spinner assemblies 9 are substantially identical and for simplicity, only one such assembly will be described in detail.

The assembly 9 is limited in its longitudinally movement with respect to the coil spring 4 in one direction (in the direction of the hook end or front end) by means of a collar 7 fixed to coil spring 4. A plurality of beads 8 may be positioned around coil spring 4 between collar 7 and the clevis and spinner assembly 9. These beads 8 serve as bearings for the rotation of the clevis and spinner assembly 9 as well as serving as attractors themselves. Beads 8 are adapted to rotate about coil spring 4.

The clevis and spinner assembly 9 is concentrically mounted on coil spring 4 behind beads 8. Clevis and spinner assembly 9 comprises a body 12 formed from a portion of a coiled length of spring wire. Body 12 is tubular in configuration and has an inner diameter slightly larger than the outer diameter of coil spring 4 so that it may rotate about coil spring 4. The remaining portion of the wire forming body 12 is bent laterally outwardly for a short distance to form lateral portion 13 and then bent to form a loop portion 14. The terminal portion of loop 14 is bent to form a hook 14a. Hook 14a may be releasably engaged by a suitable bending movement with another part of loop 14 or lateral portion 13 to provide a spinner retaining structure. Spinner 15 is removably linked to loop 14 through hole 15a.

The rotational rate of spinner 15 along with loop 14, lateral portion 13, and body 12 about coil spring 4 is regulated by bending the clevis assembly 9 in the vicinity of lateral portion 13 so as to place the loop 14 in differing positions with respect to body 12 such as those illustrated in FIGS. 5 and 6.

When lateral portion 13 is bent to bring loop 14 toward body 12 as shown in FIG. 5, the rotational rate of spinner 15 is relatively accelerated. By bending lateral portion 13 so as to bring loop 14 away from body 12 as shown in FIG. 6, the rotational rate of spinner 15 about coil spring 4 is relatively decelerated. Intermediate positions are, of course, possible for finer adjustments of speed control.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A clevis and a lure for attachment to a fishing line, said clevis comprising a tubular body adapted to receive the line therethrough and rotatable about the line, a loop member for attaching a lure thereto at one end of said tubular body and projecting therefrom, said loop having first and second ends, the first end of said loop member being joined to said tubular body at said one end and the second end forming a hook for releasable engagement with another portion of the loop member adjacent said one end of said tubular body, said loop member being bendable toward and away from said body whereby the rate of rotation of the body under impetus from a lure attached to said loop member may be accelerated by bending the loop member toward the body and the rotational rate decelerated by bending the loop member away from the body.

2. A clevis in accordance with claim 1 wherein the tubular body is in the form of a coil spring wire and said loop member being an integral part thereof, said loop being bendable toward and away from the body to a substantially 90° arc.

3. A free-sliding trolling spinner unit comprising an open ended tubular base member formed from a flexible coil spring wire and adapted to permit a leader to pass freely therethrough, a spinner, at least one clevis having a loop mounted on said tubular base member, said clevis comprising a tubular body concentrically positioned around said tubular base member for attaching a spinner thereto in said loop and adapted to rotate thereon, said clevis including a spring loop member having first and second ends, the first end of said loop member being joined to said body at one end thereof and projecting therefrom, the second end of said loop forming a hook for releasable engagement with another portion of the loop member adjacent said one end of said tubular body, said loop member being bendable toward and away from said body whereby the rate of rotation of the spinner about the tubular base member may be controlled, and means associated with said tubular base member for limiting longitudinal movement of each clevis in one direction on said base member.

4. A free sliding trolling spinner unit according to claim 3 and wherein the tubular body is in the form of a coil spring wire and the said loop member is an integral part thereof bendable toward and away from said body through a substantially 90° arc.

References Cited in the file of this patent

UNITED STATES PATENTS

| 1,353,779 | Moore | Sept. 21, 1920 |
| 2,486,635 | Coats | Nov. 1, 1949 |
| 2,572,721 | Hatt | Oct. 23, 1951 |
| 2,785,496 | Menkens | Mar. 19, 1957 |
| 2,955,380 | Hulick | Oct. 11, 1960 |